No. 778,807.                                     Patented December 27, 1904.

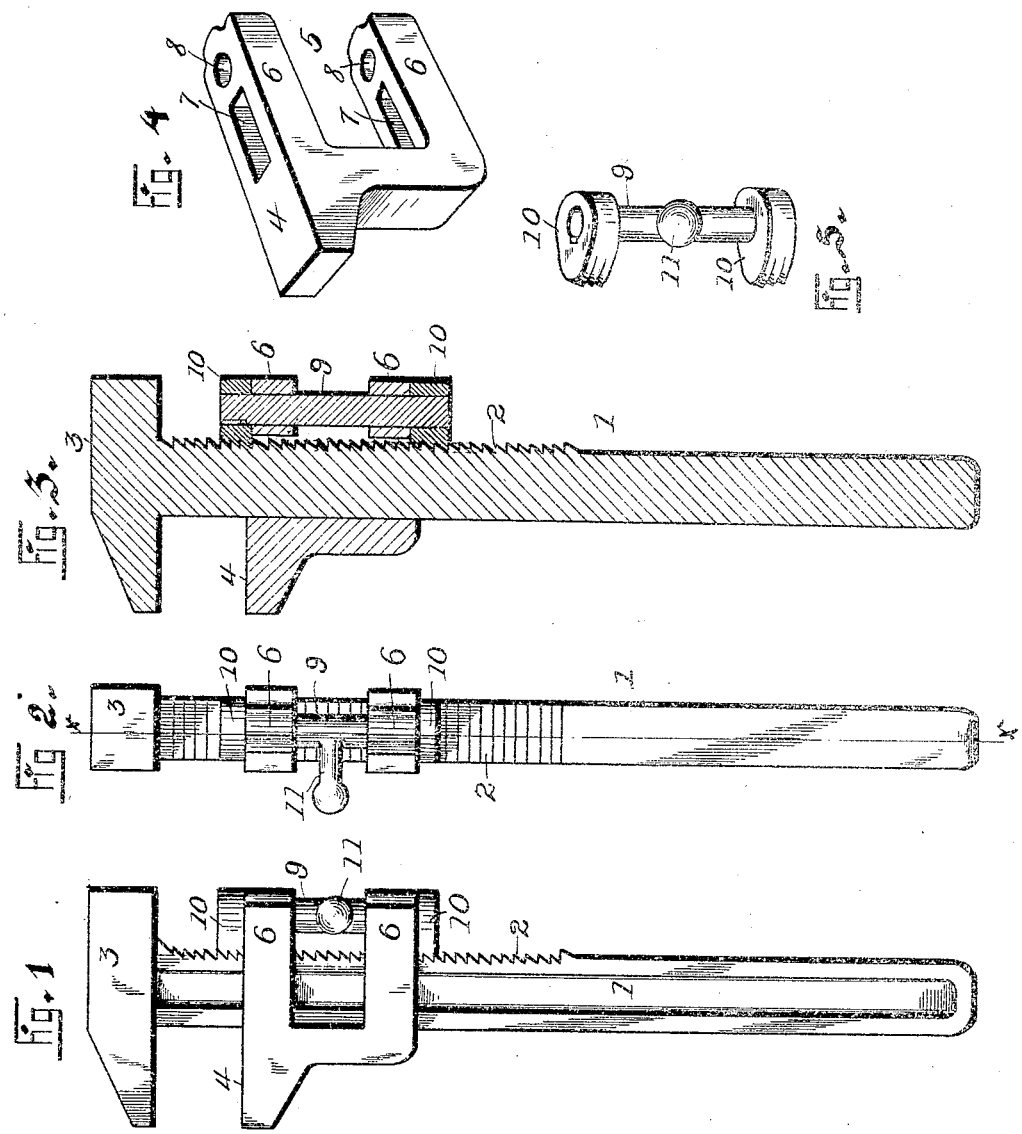

UNITED STATES PATENT OFFICE.

CHARLES H. SPAULDING, OF BRILLIANT, OHIO.

WRENCH.

SPECIFICATION forming part of Letters Patent No. 778,807, dated December 27, 1904.

Application filed October 1, 1903. Serial No. 175,308.

*To all whom it may concern:*

Be it known that I, CHARLES H. SPAULDING, a citizen of the United States of America, residing at Brilliant, in the county of Jefferson and State of Ohio, have invented certain new and useful Improvements in Wrenches, of which the following is a specification, reference being had therein to the accompanying drawings.

My invention relates to an improvement in wrenches, and particularly to that class in which a quick adjustment is obtained; and it consists in the combination of parts, which will be hereinafter more fully set forth and specifically claimed.

In the accompanying drawings, Figure 1 is an elevation or plan of a wrench constructed in accordance with my invention and showing the movable jaw in the locked position. Fig. 2 is an edge view thereof. Fig. 3 is a longitudinal sectional view taken on the line $x\ x$ of Fig. 2. Fig. 4 is a detached perspective view of the movable jaw with the locking device removed therefrom. Fig. 5 is a detached perspective view of the locking device.

In the embodiment of my invention herein illustrated the shank 1 is provided on its rear face with teeth 2 and has an integral jaw 3 at its outer end. The sliding or movable jaw 4 is cut away in its back, as indicated at 5, thus forming arms 6 6, spaced from each other and which arms are provided with openings 7 for the admission of the shank 1 of the wrench. The arms 6 6 are also provided with openings 8, the arms being thus constituted to serve as bearings for a rod or shaft 9, which is pivoted or mounted for rotation in said apertures 8. This rod or shaft 9 extends beyond the sides of the arms 6 6, and on the extended ends of the said rod or shaft are mounted cams 10, which may be held on the rod or shaft to be revolved therewith in any desired manner, and each of the cams is provided with teeth which are adapted to take into or mesh with the teeth 2 on the shank 1. The shaft 9 is provided with a suitable knob or handle 11, which is located thereon at a point between the arms 6 6 and forms a means for operating the rod or shaft to turn the cams 10 into locking engagement with the teeth on the shank 1 or remove said cams from engagement with said teeth.

To operate the slidable or movable jaw to adjust the same, it is only necessary to actuate the rod or shaft 9 by means of its knob or handle 11, so as to throw the toothed or serrated cams out of engagement with the teeth of the wrench-shank, and when the jaw has been adjusted to the desired position a reverse movement imparted to the rod or shank 1 will engage the toothed or serrated cams with the teeth 2 of the wrench-shank 1 and lock the jaw in its adjusted position. It is to be observed, therefore, that the engagement with and the disengagement from the shank of the cams is effected simply by the locking of the rod or shaft 9 in its bearings or journals.

Having thus fully described my invention, what I claim as new, and desire to secure by Letters Patent, is—

A wrench embodying a shank having a sliding jaw thereon, spaced arms on said jaw with a rod pivoted in the arms and extending therebeyond, a cam on each end of said rod adjacent the outer faces of the arms for engagement with the shank, with means for operating the rod located between the arms.

In testimony whereof I affix my signature in the presence of two witnesses.

CHARLES H. SPAULDING.

Witnesses:
   H. A. SIMMONS,
   B. F. PRENTISS.